United States Patent
Hed

(10) Patent No.: US 9,266,575 B1
(45) Date of Patent: Feb. 23, 2016

(54) CONTAINER MOUNT FOR BICYCLE AEROBAR

(75) Inventor: Steven Arthur Hed, North Oaks, MN (US)

(73) Assignee: HED Cycling Products, Inc., Shoreview, MN (US)

( * ) Notice: Subject to any disclaimer, the term of this patent is extended or adjusted under 35 U.S.C. 154(b) by 696 days.

(21) Appl. No.: 12/875,886

(22) Filed: Sep. 3, 2010

Related U.S. Application Data

(60) Provisional application No. 61/240,110, filed on Sep. 4, 2009.

(51) Int. Cl.
*B62J 11/00* (2006.01)
*B62J 9/00* (2006.01)

(52) U.S. Cl.
CPC *B62J 11/00* (2013.01); *B62J 9/001* (2013.01); *Y10S 224/926* (2013.01)

(58) Field of Classification Search
CPC .............. B62J 11/00; B62J 9/003; B62J 7/06; B62J 9/001; B62J 7/04; B62J 9/00; B62J 6/02; B62J 7/02; B62K 19/32; B62K 21/125; Y10S 224/919
USPC ......... 224/414, 420, 448, 419, 426, 445, 447, 224/421, 428, 429, 430, 441, 442, 450–454, 224/459, 926, 462, 412, 425, 427, 431, 440, 224/443; D12/411, 407; 74/551.8; 362/474
See application file for complete search history.

(56) References Cited

U.S. PATENT DOCUMENTS

| 498,015 | A | * | 5/1893 | Luebben | 224/448 |
| D27,766 | S | * | 10/1897 | Fuller | D12/114 |
| 652,325 | A | * | 6/1900 | McKnight | 224/431 |
| 2,169,256 | A | * | 8/1939 | Kraeft | 340/815.69 |
| 2,634,527 | A | * | 4/1953 | Pletscher | 40/643 |
| 4,170,337 | A | * | 10/1979 | Davis | 248/475.1 |
| 4,379,281 | A | * | 4/1983 | Thomas | 340/427 |
| 4,386,721 | A | | 6/1983 | Shimano | |
| 4,570,835 | A | | 2/1986 | Crique et al. | |
| 4,754,902 | A | * | 7/1988 | Opfergelt | 224/414 |
| 5,115,952 | A | | 5/1992 | Jenkins | |
| 5,197,640 | A | * | 3/1993 | Hurley et al. | 224/414 |
| 5,624,064 | A | | 4/1997 | McGee, Jr. | |
| 5,649,657 | A | * | 7/1997 | Chuang | 224/430 |
| 5,803,328 | A | | 9/1998 | Nakahara | |
| 6,279,803 | B1 | | 8/2001 | Smerdon, Jr. | |
| 6,378,815 | B1 | * | 4/2002 | Lee | 248/121 |
| 6,401,997 | B1 | | 6/2002 | Smerdon, Jr. | |
| 6,616,021 | B1 | | 9/2003 | Shih | |
| 6,932,255 | B2 | * | 8/2005 | Van Houtte | 224/414 |
| 7,213,485 | B2 | * | 5/2007 | Huang | 74/551.8 |

(Continued)

*Primary Examiner* — Adam Waggenspack
*Assistant Examiner* — Matthew Theis
(74) *Attorney, Agent, or Firm* — Sprinkle IP Law Group

(57) ABSTRACT

Embodiments described herein provide container mounts for mounting water bottles, bento boxes, tool holders or other containers in an aerodynamic position. According to one embodiment, the container mount can include an attachment member to attach to the bicycle frame or aerobars. One or more container support members are coupled to the attachment member in a fixed orientation or in a manner that allows the position of the support member to be adjusted. The container mounts can be configured so that the container is positioned within the aerodynamic profile of the rider's torso between the rider's arms (when viewed from the front) and is accessible by the rider while the rider maintains aerodynamic form.

20 Claims, 21 Drawing Sheets

(56) References Cited

U.S. PATENT DOCUMENTS

| | | |
|---|---|---|
| 2003/0140727 A1* | 7/2003 | Chuang .................. 74/551.8 |
| 2005/0166704 A1* | 8/2005 | Huang .................... 74/551.8 |
| 2005/0252331 A1* | 11/2005 | Chen ..................... 74/551.8 |
| 2007/0012740 A1 | 1/2007 | Montgomery |
| 2007/0039409 A1* | 2/2007 | Meng ..................... 74/551.8 |
| 2007/0068985 A1* | 3/2007 | Nakahara ................ 224/420 |
| 2007/0296179 A1* | 12/2007 | Orr et al. ............... 280/288.4 |
| 2008/0283704 A1* | 11/2008 | Hsu ...................... 248/230.5 |
| 2010/0059565 A1 | 3/2010 | Cote |
| 2010/0072232 A1* | 3/2010 | Rider .................... 222/610 |

* cited by examiner

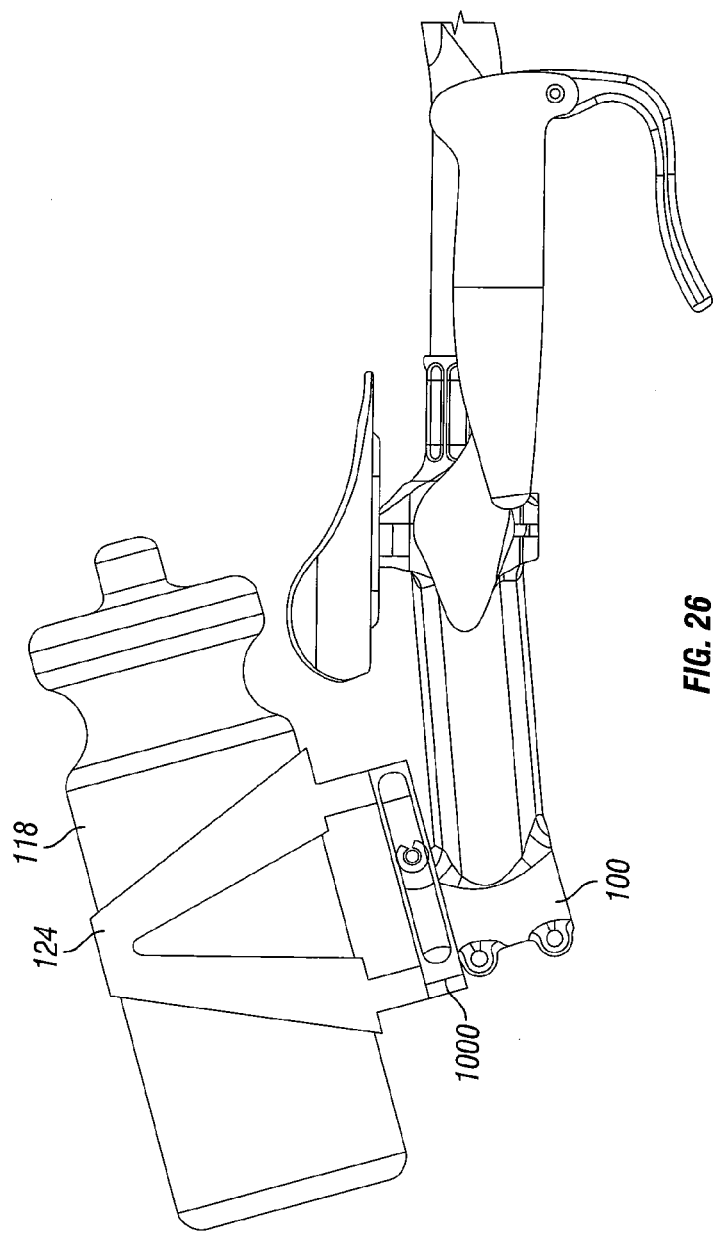

CONTAINER MOUNT FOR BICYCLE AEROBAR

CROSS-REFERENCE TO RELATED APPLICATIONS

This application claims the benefit of priority under 35 U.S.C. 119(e) to U.S. Provisional Patent Application No. 61/240,110 entitled "Container Mount for Bicycle Aerobar" by Hed, filed Sep. 4, 2009, which is hereby fully incorporated by reference herein.

BACKGROUND

Drag, or wind resistance, is a significant force acting against the motion of cyclists. The amount of drag is dependent on the cross sectional profile of the rider moving through air. Consequently, cyclists attempt to reduce wind resistance by riding in a position that reduces their profile. To this end, many competitive cyclists use aerobars that allow riders to ride in a more favorable position. Aerobars typically include straight, s-bend or ski-bend tubular extensions that extend forward from the bicycle to provide an area that the cyclist can grip while in an aerodynamic position. In many aerobar designs, a lateral portion joins the extensions and supports armrests. A cyclist grips near the forward most portion of the extensions and rests his or her forearms on armrests allowing the rider to ride in a crouched position that is more aerodynamic.

In addition to aerodynamics, the physical well being of the rider affects performance. In order to maintain high performance, a cyclist must remain well hydrated. However, hydration often comes at the price of speed as water bottles are currently mounted in difficult to reach places that require the rider to break his or her aerodynamic form to access the bottle. The most common existing system is a water container that is suspended in front of the bicycle stem and between the aerobars. The rider uses a straw to drink the water. The problem with this type of a system is that the container is difficult to refill. Consequently, competitors in triathlons or bicycle races must slow down to refill the bottle.

Another solution is to mount a standard water bottle cage transversely across the aerobars. This requires riders to maintain their forearms further apart in a less aerodynamic position. Additionally, water bottles mounted in this manner can be difficult to remove from the cage while maintaining a fully crouched form (aero form) and often require that the rider move to a less aerodynamic position when the rider wishes to hydrate. In many cases, the rider must remove the bottle from beneath and between the aero handlebars, diverting the rider's attention from the road leading to decreased safety.

Other riders use a traditional frame mounted water bottles. This solution is not desirable because the bottle is not close to the rider's mouth. Reaching down for the bottle breaks the rider's aero position and slows him or her down. With a frame mount bottle the options are to lose speed due to position or lose performance by not hydrating.

SUMMARY OF THE DISCLOSURE

Embodiments described herein provide container mounts for mounting water bottles, bento boxes, tool holders or other containers in an aerodynamic position. According to one embodiment, the container mount can include an attachment member such as a bracket, collar or other attachment member to attach to the bicycle frame, steerer tube or aerobars. One or more container support members are coupled to the attachment member, either in a fixed orientation or in a manner that allows the position of the support member to be adjusted. The support members can include extensions such as plates, tabs, tubular extensions or other extensions or support members. The container mounts are configured so that the container is positioned within the aerodynamic profile of the rider's torso between the riders arms (when viewed from the front) and is accessible by the rider while the rider maintains aero form.

Another embodiment can include a method of holding a container on a bicycle with aerobars having extensions. The method can include providing a container mount having an attachment member and a support member adapted to support a container. The method can further include coupling the attachment member to the bicycle such that the support member is positioned to support the container in a position between the rider's arms (when viewed from the front) such that the container will be in the profile of the rider's torso when riding (when viewed from the front) and be accessible by the rider without breaking aero form.

Embodiments described herein provide an advantage by placing the container in a position that allows the rider to position the aerobar extensions in the position that provides the optimum balance of aerodynamics and comfort for that rider.

Embodiments described herein provide another advantage by providing a container mount that allows the container to be positioned so that the container can cool the rider (e.g., so that a water bottle, container of ice or other chilled container contacts the rider's arms and provides cooling).

Embodiments described herein provide yet another advantage by mounting containers in a position that allows the container to be accessed without the rider breaking his or her aero form. For example, according to one embodiment, the rider can remove a water bottle from a water bottle cage without breaking aero form. Consequently, the rider will not lose as much speed when replacing an empty water bottle.

BRIEF DESCRIPTION OF THE DRAWINGS

The drawings accompanying and forming part of this specification are included to depict certain aspects of the disclosure. A clearer impression of the disclosure will become more readily apparent by referring to the exemplary, and therefore non-limiting, embodiments illustrated in the drawings. Wherever possible, the same reference numbers will be used throughout the drawings to refer to the same or like features (elements). The drawings are not necessarily drawn to scale.

FIGS. 25-26 are diagrammatic representations of yet another embodiment of a container mount for a bicycle.

DETAILED DESCRIPTION

Figure 1:
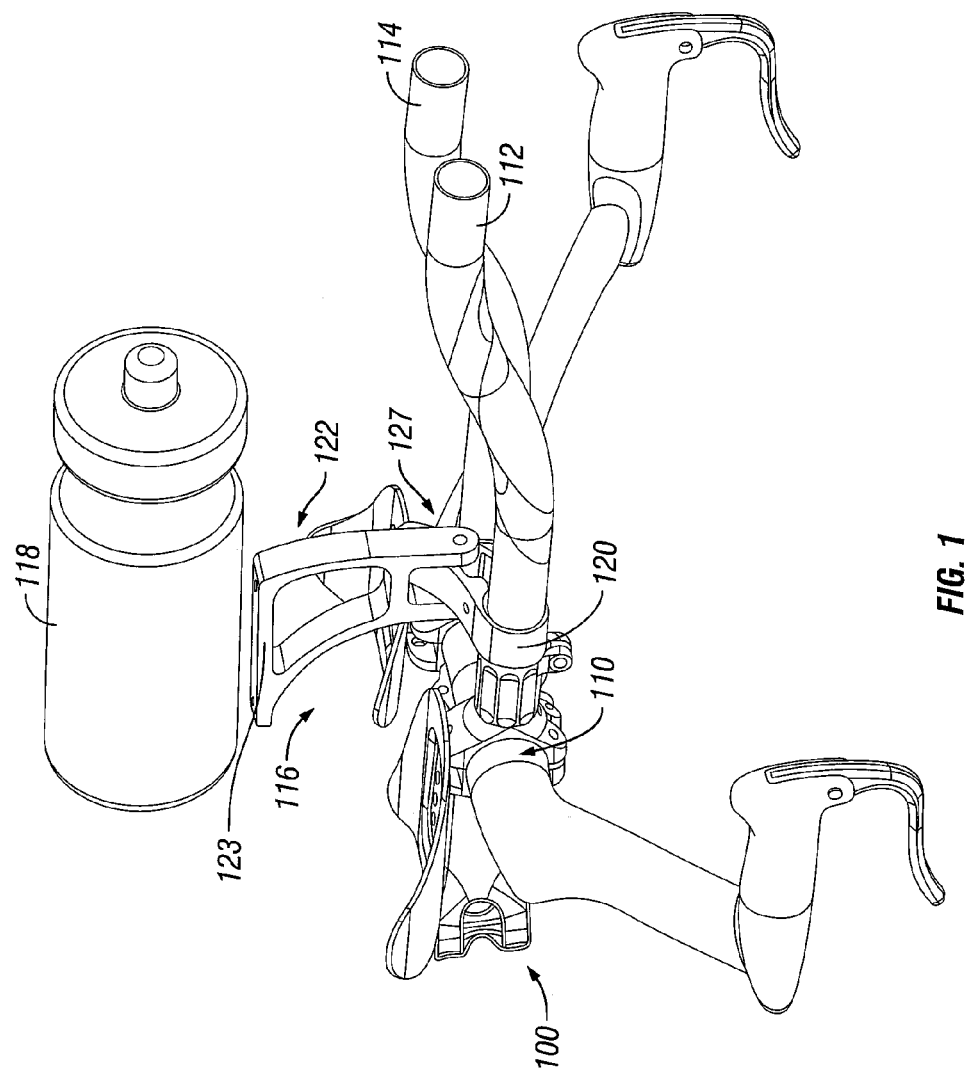
FIGS. 1-4 are diagrammatic representations one embodiment of a container mount for a bicycle.
Figure 2:
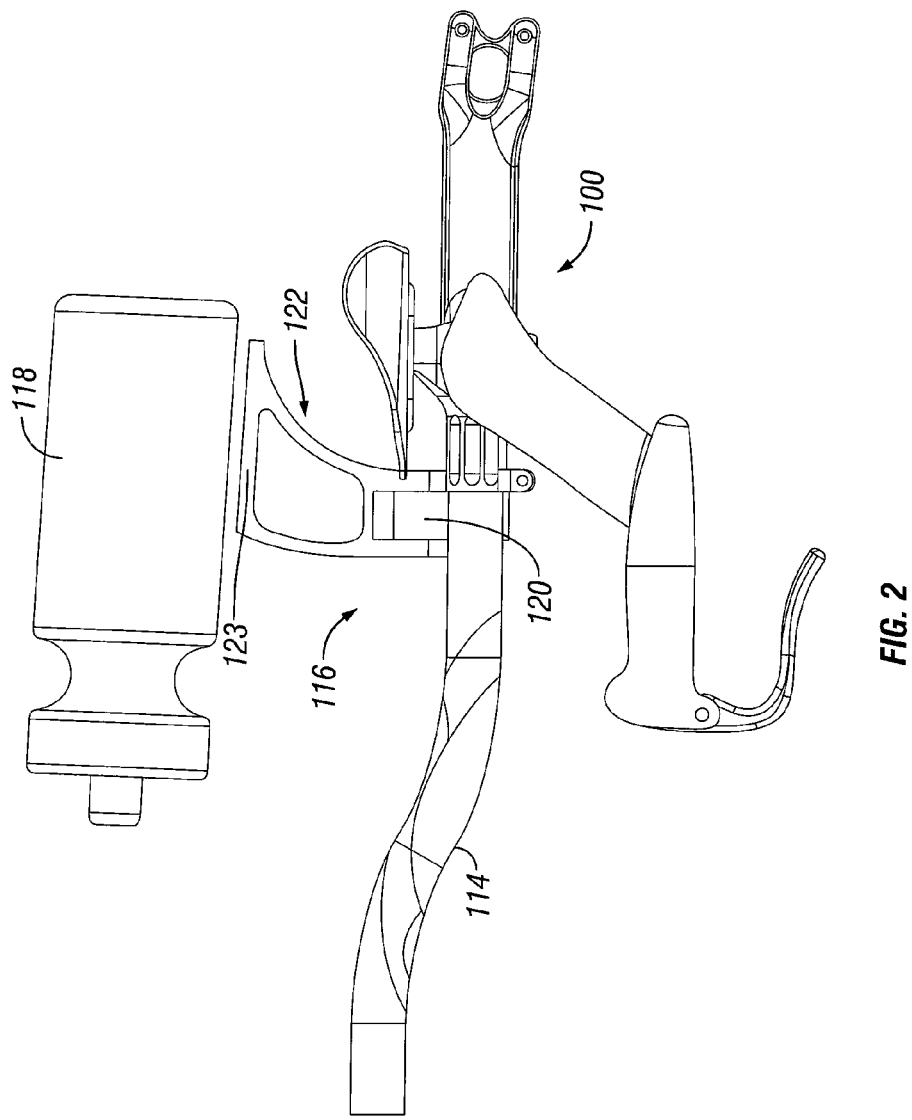
Figure 3:
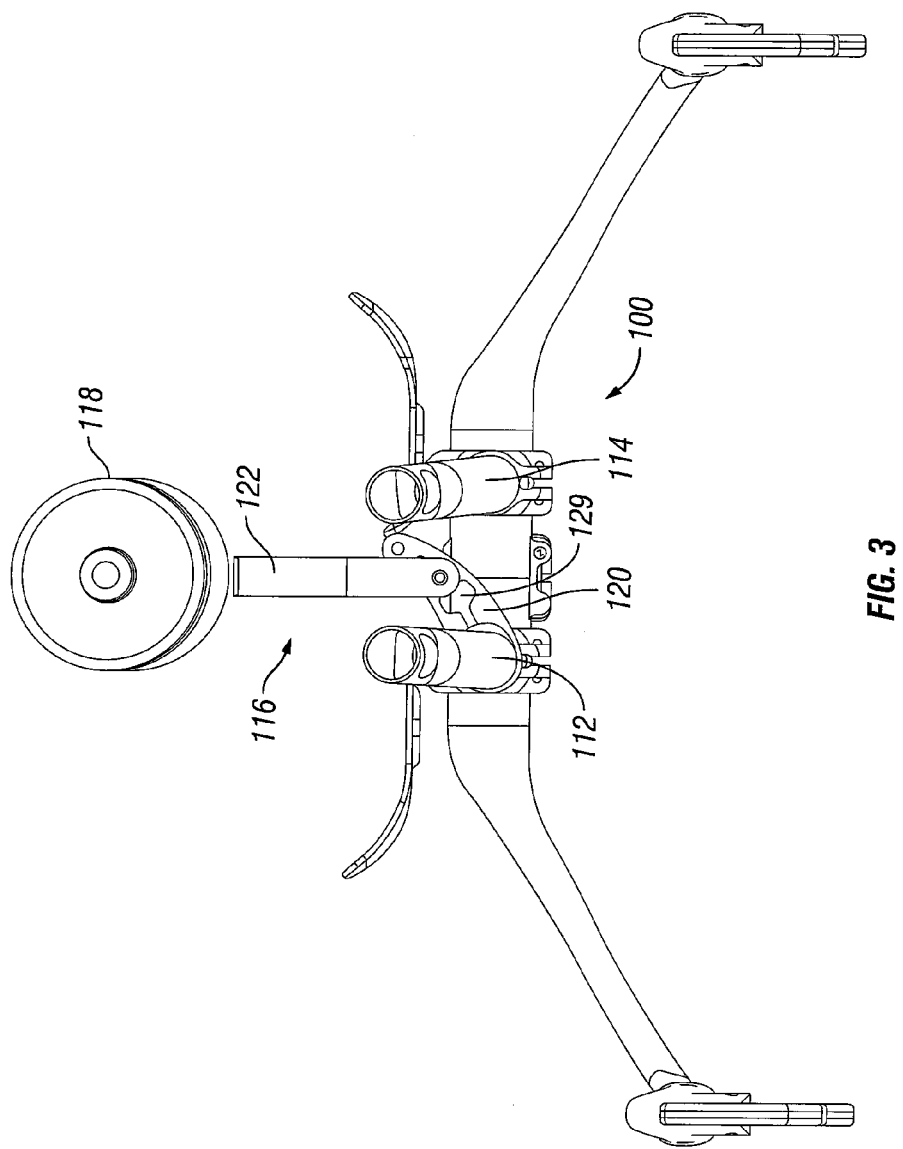
Figure 4:
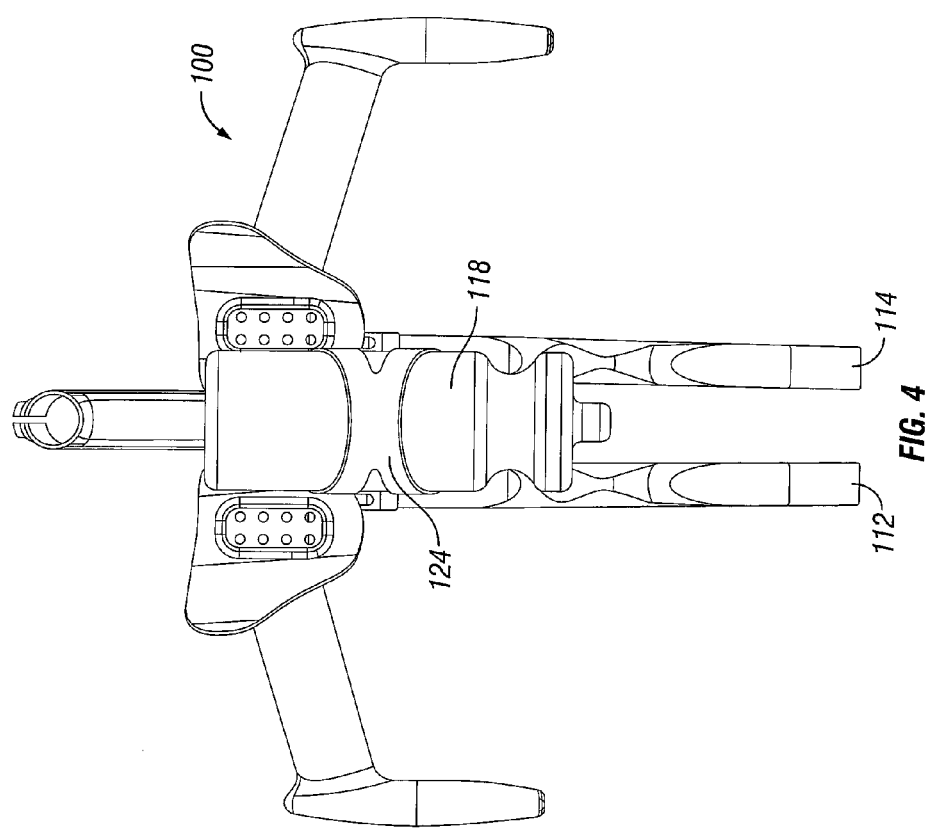

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like. Reference is now made in detail to the exemplary embodiments of the disclosure, examples of which are illustrated in the accompanying drawings. Wherever possible, like numerals will be used throughout the drawings to refer to like and corresponding parts (elements) of the various drawings.

Embodiments described herein provide container mounts for mounting water bottles, carryall boxes, tool holders or other containers in an aerodynamic position. Embodiments of container mounts described herein can include an attachment member to attach the mount to an aerobar extension, a lateral portion of the aerobar, the bicycle steerer tube or other portion of the aerobars or bicycle. Examples of attachment members include, but are not limited to, collars, brackets, straps, or other attachment members. In other embodiments, the attachment member may be a portion of the container mount that provides holes or other features so that the container mount can be attached to the aero bars or other portion of the bicycle using screws or other hardware. The container mount also includes one or more support members to support the container. The container mount is adapted so that the support member(s) position the container (e.g., a water bottle) within the profile of the rider's torso and between the rider's arms (when viewed from the front). The container mount can be aligned to balance functionality and aerodynamics. For example, a container mount can be configured so that a water bottle rests in a horizontal position with its long axis aligned with the direction of travel of the bicycle or tilted to a select angle from the ground.

The container can be mounted so that the rider's arms fit under the container. Again using the example of a water bottle, the water bottle can be mounted so that the widest portion of the water bottle is higher than the rider's forearms. This allows the rider to select a broader range of arm positions. The ability to select a wider range of arm positions is advantageous because rider arm position can affect three different components that ultimately relate to speed on the bike—1) aerodynamics (affecting how much effort is required to move the bike); 2) power (how much power the rider can generate); and 3) comfort (which can affect power). These three interplay with one another. For example, a rider can put their arms in the most aerodynamic position for them, but if they lose power and/or are so uncomfortable that they continually move out of the aero position (e.g., sit up a stretch), then the most aerodynamic arm position will not increase their overall speed.

A rider, using embodiments according to the teachings of the present disclosure, can position his or her arms in whatever position maximizes these constraints. In other words, because the water bottle or other container is mounted in a manner that does not interfere with or minimizes interference with the rider's arm position, the rider can position his or her arms in any place along the top of the aerobars. Consequently, each rider can select an aerobar position that best accounts for the aerodynamics, power and comfort of that rider. Additionally, the water bottle is positioned so that the rider can easily remove the water bottle from the cage with a generally forward sliding motion without breaking his or her aerodynamic position. This increases safety and reduces speed losses due to hydrating.

While various embodiments are described in terms of holding a water bottle, embodiments of container mounts can be used to hold any number of containers including, as non-limiting examples, a food container, a gel container, a container for liquids other than water, a container for personal items or other container. Additionally, the container can have a shape that is different from a traditional water bottle. Examples of nontraditional water bottles include, but are not limited to, the AeroDrink water bottle system by Profile Design, the Elite Time Trial water bottle, Arundel Chrono Bottle Systems and other shaped water bottles. Another example of a container is a carryall container such as a Bento Box, such as those by TNi-usa of Pleasanton Calif.

FIGS. 1-4 are diagrammatic representations of one embodiment of an aerobar 100 having a lateral portion 110, arm extensions 112 and 114 and a mount 116 for a water bottle cage 124 (see FIGS. 3 and 4) for holding a water bottle 118. Mount 116 can mount to one or more of the aerobar extensions 112 and 114. According to the embodiment of FIG. 1, an attachment member, in this example collar member 120, fits over extension 112. Collar member 120 can be sized to create a secure fit with extension 112 or may include an adjustment mechanism to adjust the size of the collar to achieve a secure fit.

A mounting bracket is coupled to collar member 120 at joint 127 in a manner that allows rotation relative to collar member 120. According to one embodiment, mounting bracket 122 can rotate about a horizontal axis of rotation that is parallel with direction travel of the bicycle. The coupling can have sufficient friction so that mounting bracket 122 can remain in the same position relative to collar member 120 once placed in a desired orientation, but can be moved if sufficient force is applied by the rider. In other embodiments, a securing mechanism such as a lock or ratchet can be used to maintain mounting bracket 122 and collar member 120 in a desired orientation. According to one embodiment, collar member 120 can form channel 129 (see FIG. 3). Joint 127 can be formed by a complementary pin or other member attached to bracket 122 and that extends through channel 129. Bracket 122 can be moved along channel 129 to position the end of bracket 122 closer to or further from extension 112 as desired.

According to one embodiment, mounting bracket 122 acts as a support member to support a water bottle. The top portion 123 of mounting bracket 122 acts as a platform to which a water bottle cage (or other container or container holder) can be attached. The top portion of mounting bracket 122 can include spaced holes to receive mounting bolts or other fasteners to attach water bottle cage 124. Mounting bracket 122 can have a variety of shapes including a triangular or other shaped fin and can be made of any suitable material including, but not limited to, steel, aluminum, plastic or carbon fiber. As shown in FIG. 1, mounting bracket 122 can have open areas to reduce weight.

A water bottle cage (shown in FIGS. 3 and 4) can mount to mounting bracket 122 to hold water bottle 118 with its long axis horizontal to the ground. Water bottle 118 can be a standard or nonstandard sized and shaped water bottle. According to one embodiment, water bottle 118 (or other container) can include a straw (drinking tube) so that the rider does not have to remove bottle 118 from mount 116 to hydrate. The rider can remove water bottle 118 from cage 124 with a generally forward motion without breaking his or her crouched position. Consequently, the rider can replace water bottle 118 without breaking aero form.

A cyclist can adjust the height of the water bottle cage by rotating collar member 120 either clockwise or counterclockwise around extension 112 and rotating mounting bracket 122 to a desired orientation. For example, the user can rotate collar member 120 clockwise and mounting bracket 122 counterclockwise to lower water bottle 118. The cyclist can also adjust the height and position of water bottle 118 between the extensions by moving bracket 122 along channel 129.

Figure 5:
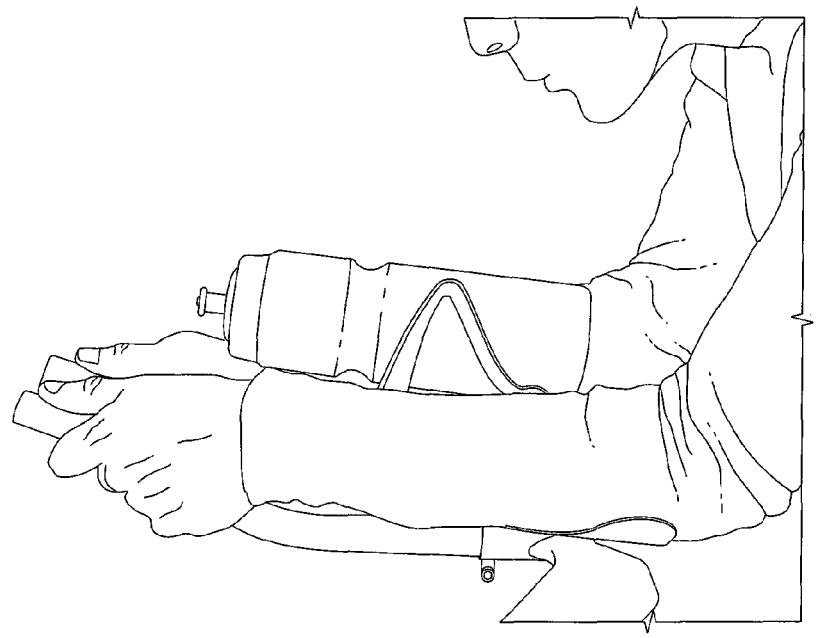
FIGS. 5-6 illustrate one embodiment of a rider using a container mount.
Figure 6:
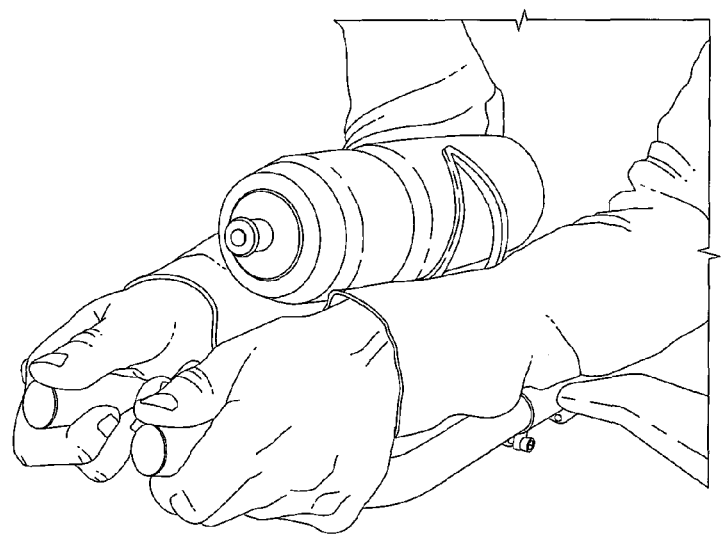
Figure 7:
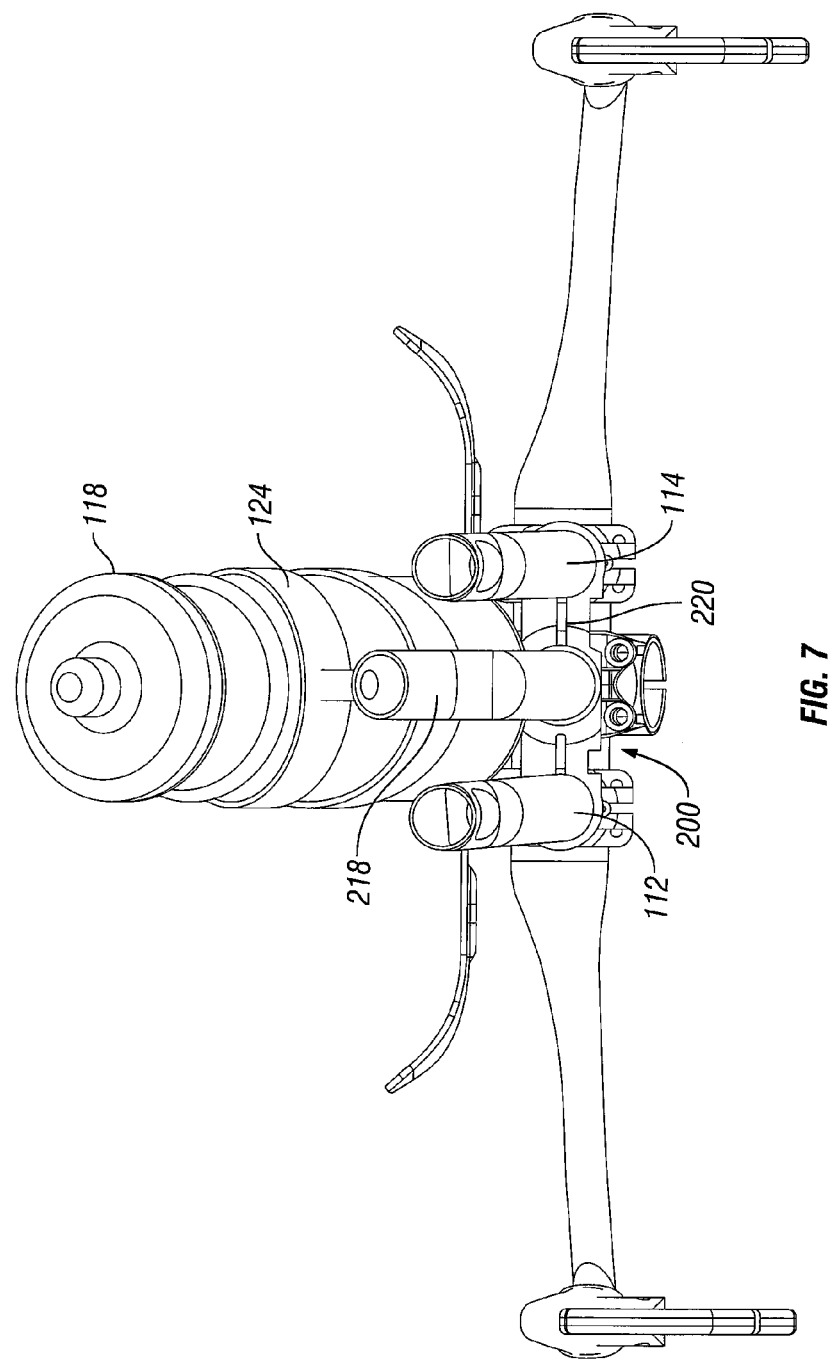
FIG. 7-10 are diagrammatic representations of another embodiment of a container mount for a bicycle.
Figure 8:
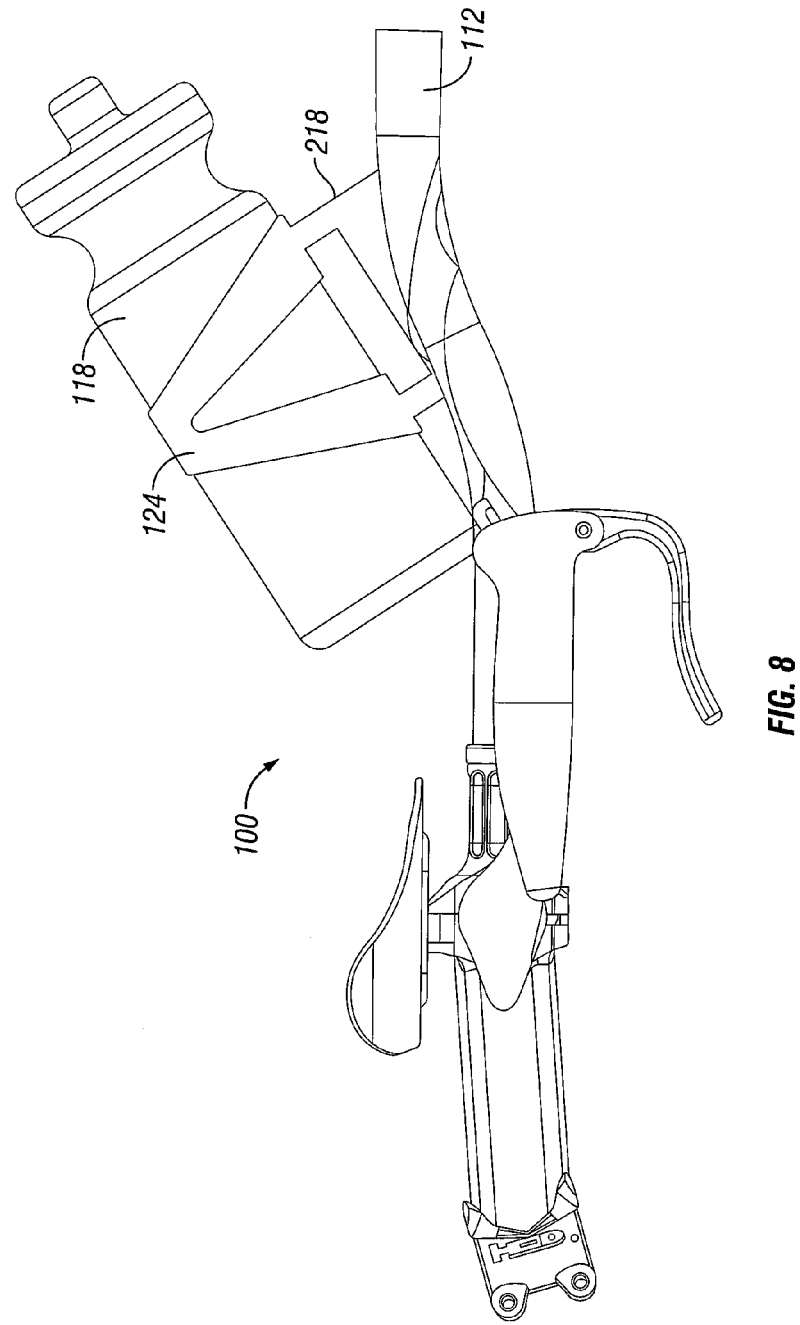
Figure 9:
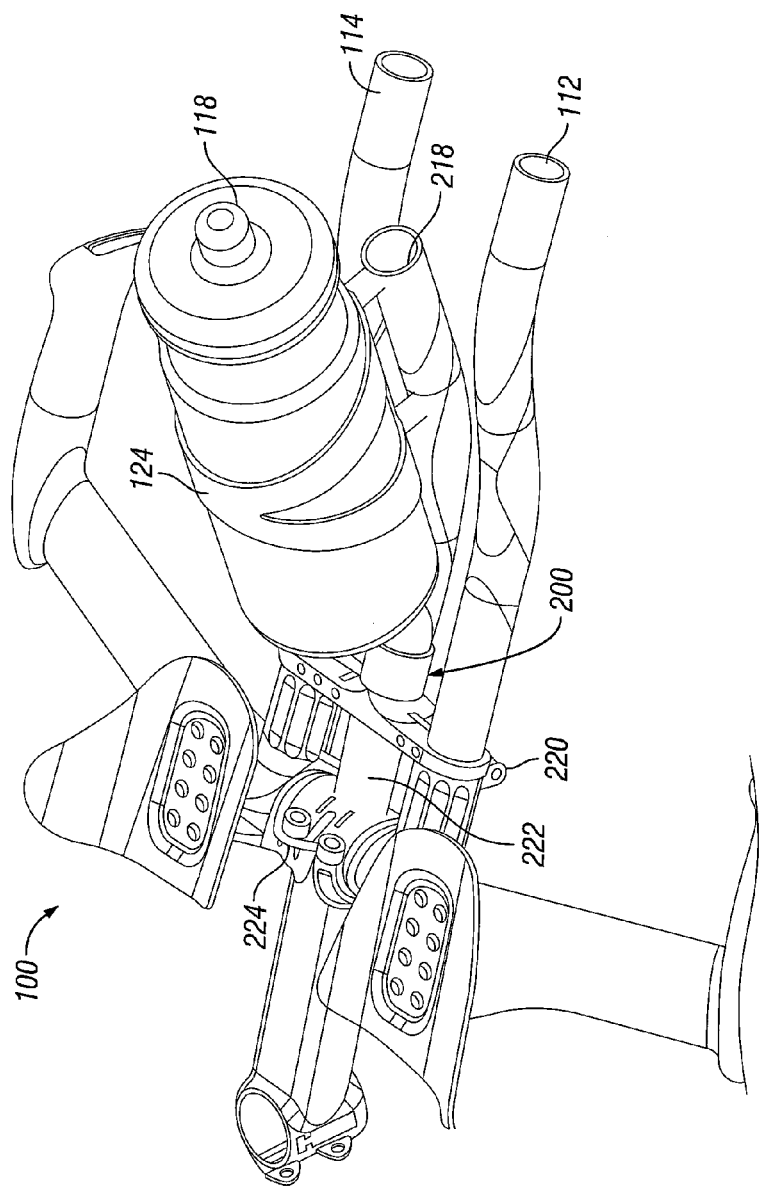
Figure 10:
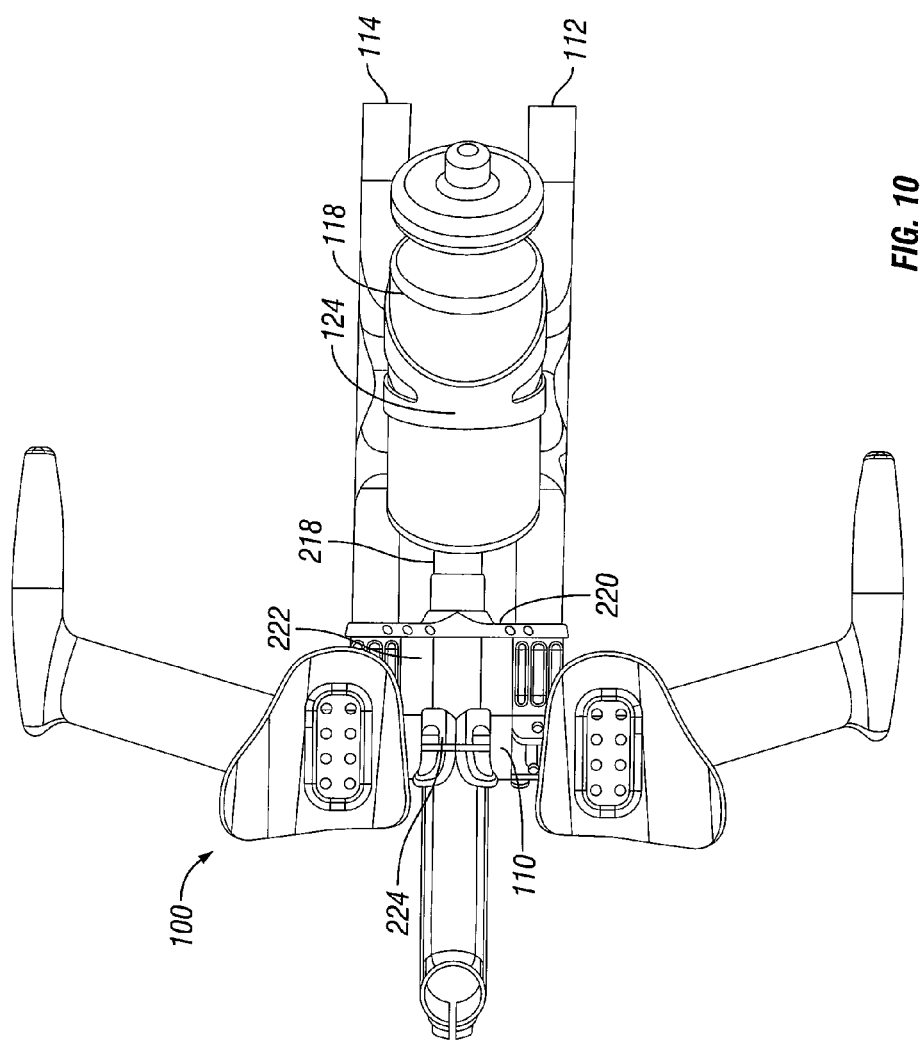

FIGS. 5 and 6 depict a rider with his arms in a riding position showing that the water bottle is mounted so that a majority of a water bottle is above the rider's forearms allowing the rider to maintain his hands closer together to form a more aerodynamic wedge shape. For example, the rider can position the extension so close together that the rider's hands touch or the aerobar system limits the extensions from being brought any closer together. The rider can position the water bottle so that the water bottle or water bottle cage contacts the rider's forearms with whatever amount of pressure the rider desires (e.g. lightly touching the rider's arms or such that the rider must forcefully wedge his or her arms under the water bottle). A cold water bottle in this position will help cool the rider.

FIGS. 7-10 are diagrammatic representations of another embodiment of a mount for mounting water bottle cage 124. In the embodiments of FIGS. 7-10, the attachment member is again a collar member 220 that, in this case, spans the distance between the extensions 112 and 114 and securely attaches to the extensions. In other embodiments, collar member 220 may attach to only one of the extensions. The support member is a tubular extension 218 extending forward from collar member 220. Tubular extension 218 can include spaced holes to receive mounting bolts or other fasteners to attach water bottle cage 124. In the embodiment of FIGS. 7-10, tubular extension 218 has a portion that tilts upward so the water bottle is positioned at an angle. The bottle 118 will be higher than the rider's forearms at least towards the front of bottle 118.

Tubular extension 218 can pass through a complementary opening in collar member 220 and abut or be coupled to a lateral portion 110 of aerobars 100. In another embodiment, collar member 220 can include a tube 222 that extends backwards and that attaches to lateral portion 110 with bracket 224 for additional stability. The end of extension 218 can pass into this tube. The distance of water bottle 118 from the rider can be adjusted by moving extension 218 forward or backwards in collar member 220. Movement of tubular extension 218 can be inhibited by friction fit, a set screw, ball and indent or other mechanism. In other embodiments, extension 218 may simply extend forward from collar member 220 without passing through collar member 220. For example, collar member 220 and tubular extension 218 may be an integrated piece, tubular extension 218 may be welded or bonded to collar member 220 or tubular extension 218 may otherwise be coupled to collar member 218. While extension 218 is tubular in the embodiment of FIGS. 7-10, the extension may have other shapes.

Figure 11:
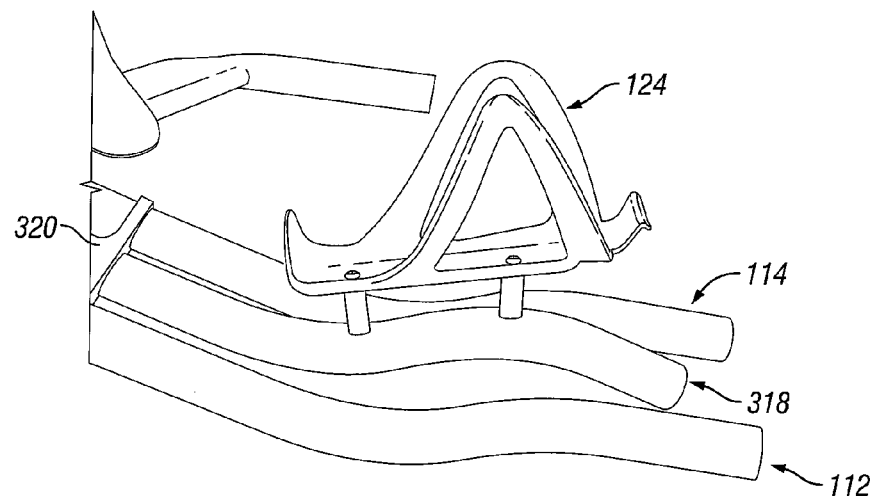
FIG. 11 is a diagrammatic representation of another embodiment of a container mount for a bicycle.

FIG. 11 illustrates another embodiment of a mount 300 for mounting water bottle cage 124. In the embodiment of FIG. 11, cage 124 mounts to an s-bar tubular extension 318. A collar member 320 can mount to one or both of the aerobar extensions 112 and 114. S-bar extension 318 can be selected to mount cage 124 at a desired height. The distance of cage 124 relative to the rider can be adjusted by moving extension 318 forward or back in collar member 320.

Figure 12:
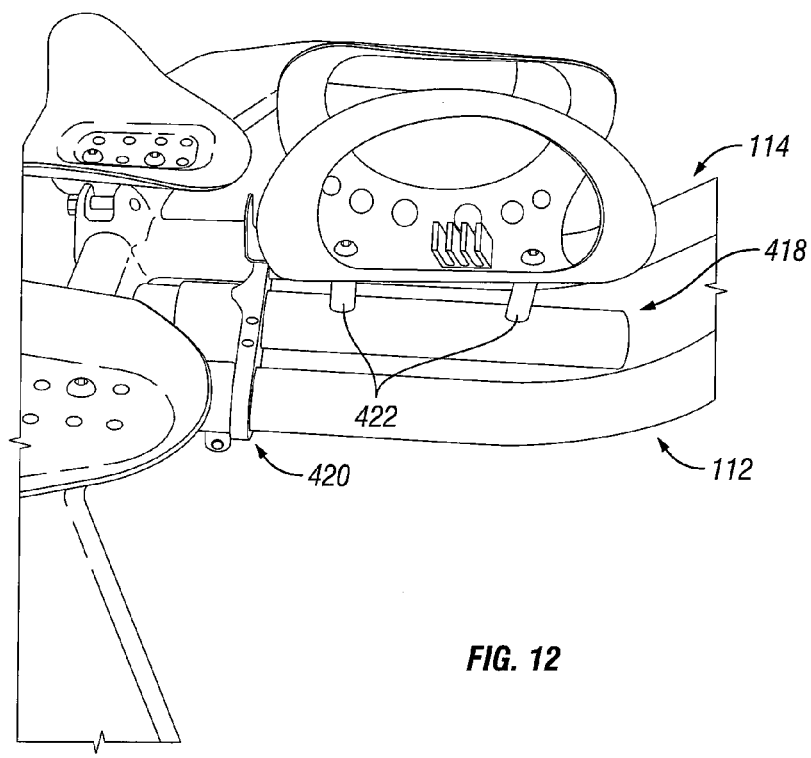
FIG. 12 is a diagrammatic representation of yet another embodiment of a container mount for a bicycle.

FIG. 12 illustrates another embodiment of a mount 400 for mounting water bottle cage 124. In the embodiment of FIG. 12, cage 124 mounts to a straight tubular extension 418. A collar 420 can mount to one or both of the aerobar extensions 112 and 114. Offsets 422 can be selected to mount cage 124 at a desired height (such spacers can also be used in conjunction with any of the other embodiments described herein). The distance of cage 124 relative to the rider can be adjusted by moving extension 418 forward or back in collar member 420. Tubular extension 418 can include spaced holes to receive mounting bolts or other fasteners to attach water bottle cage 124

Figure 13:
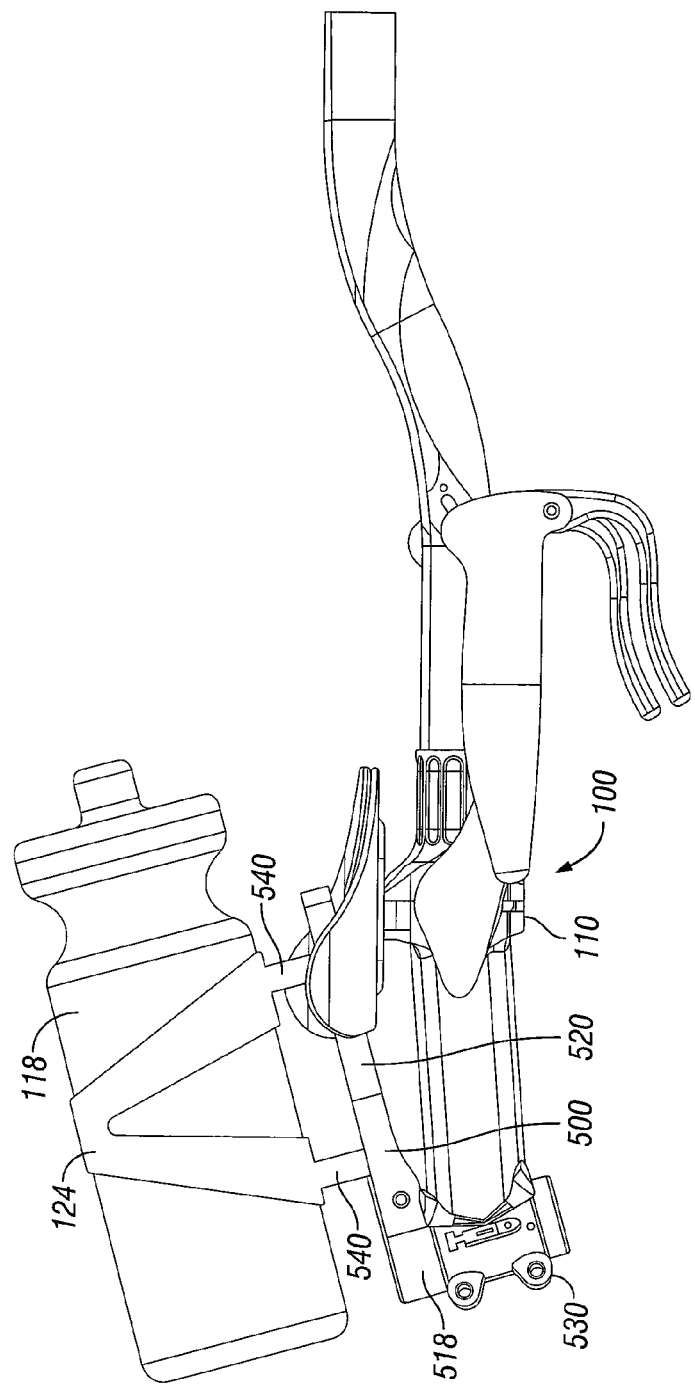
FIG. 13 is a diagrammatic representation of yet another embodiment of a container mount for a bicycle.

FIG. 13 illustrates another embodiment of a mount for mounting water bottle cage 124. In the embodiment of FIG. 13, the attachment member is a collar member 518 sized to fit around the steerer tube of the bicycle above the portion of the aerobar that couples to the steerer tube (represented at 530). A support plate 520 extends forward from collar member 518 above the aerobars. In one embodiment support plate 520 and collar 518 are coupled together as an integrated piece such that collar 518 transitions into support plate 520. In other embodiments, support plate 520 can be a separate piece coupled to collar 518 in a fixed orientation or in a manner that allows the angle of support plate 520 to be adjusted. Support plate 520 can include openings to receive mounting bolts for a water bottle cage 124. In one embodiment, cage 124 can be mounted to support member 520 using offsets 540, if desired, to raise cage 124 a desired height.

In this embodiment, the water bottle is still positioned between the rider's arms but further back such that a majority of the water bottle is behind the lateral portion 110 of aerobars 100. In other embodiments, support plate 520 can extend further to position the water bottle in front of lateral portion 110.

Figure 14:
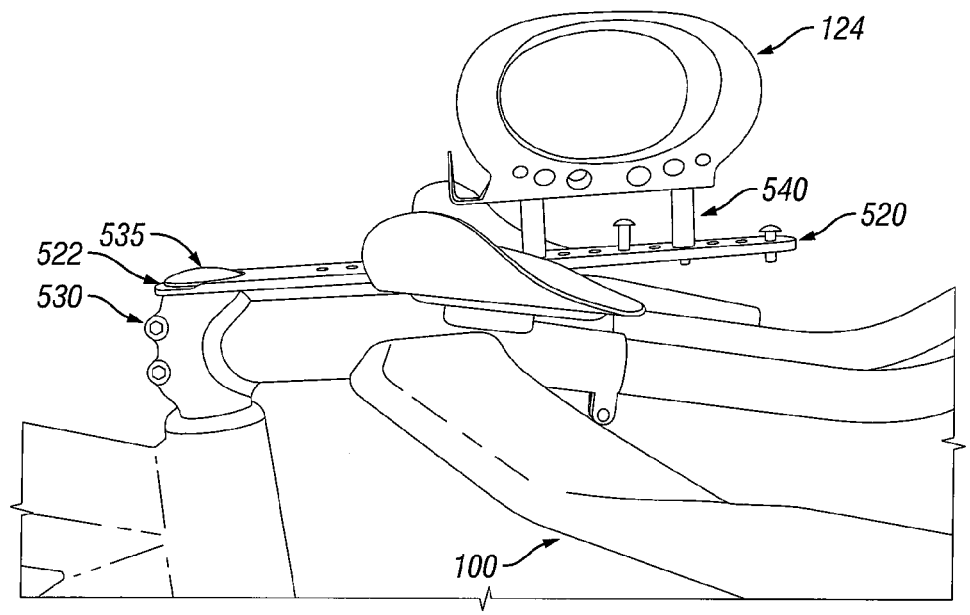
FIGS. 14-15 are diagrammatic representations of yet another embodiment of a container mount for a bicycle.
Figure 15:
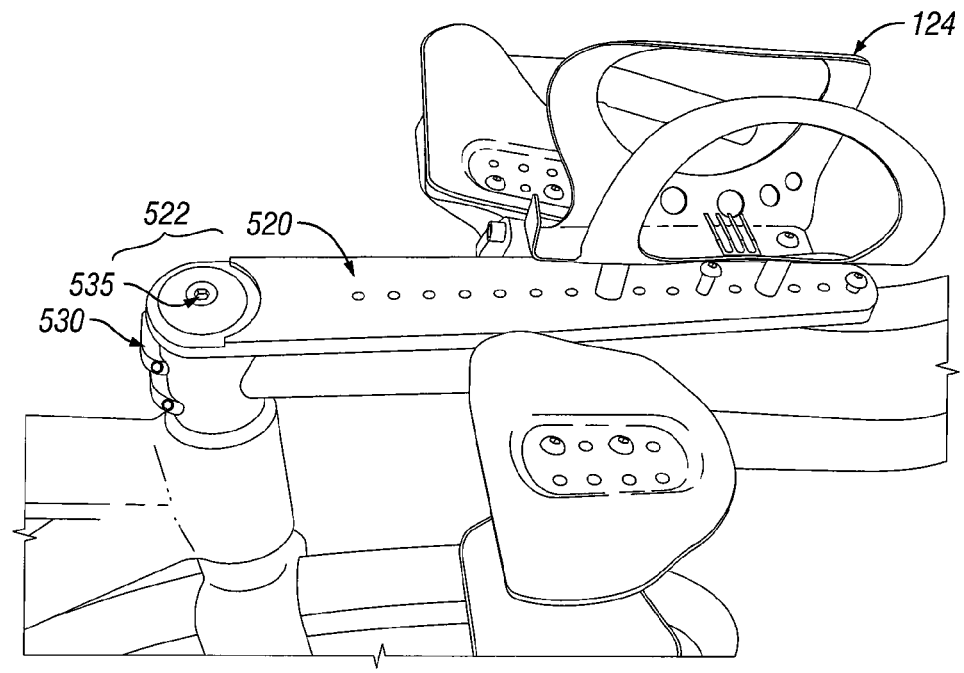

FIGS. 14-15 illustrate another embodiment of a mount having an attachment member 518 and a support plate 520. The embodiment of FIGS. 14 and 15 is similar to that of FIG. 13 except that, rather than a collar, the attachment member 522 defines an opening through which the stem cap screw 535 passes. According to one embodiment, screw 535 can be the screw that is otherwise used at the stem cap in the absence of the container mount. The height of cage 124 can be adjusted by using offsets 540 or an offset between attachment member 522 and the stem portion 530 of aerobars 100. The later may require, however, a longer screw 535 to properly couple the water bottle mount and aerobars 100 to the steerer tube of the bicycle.

Figure 16:
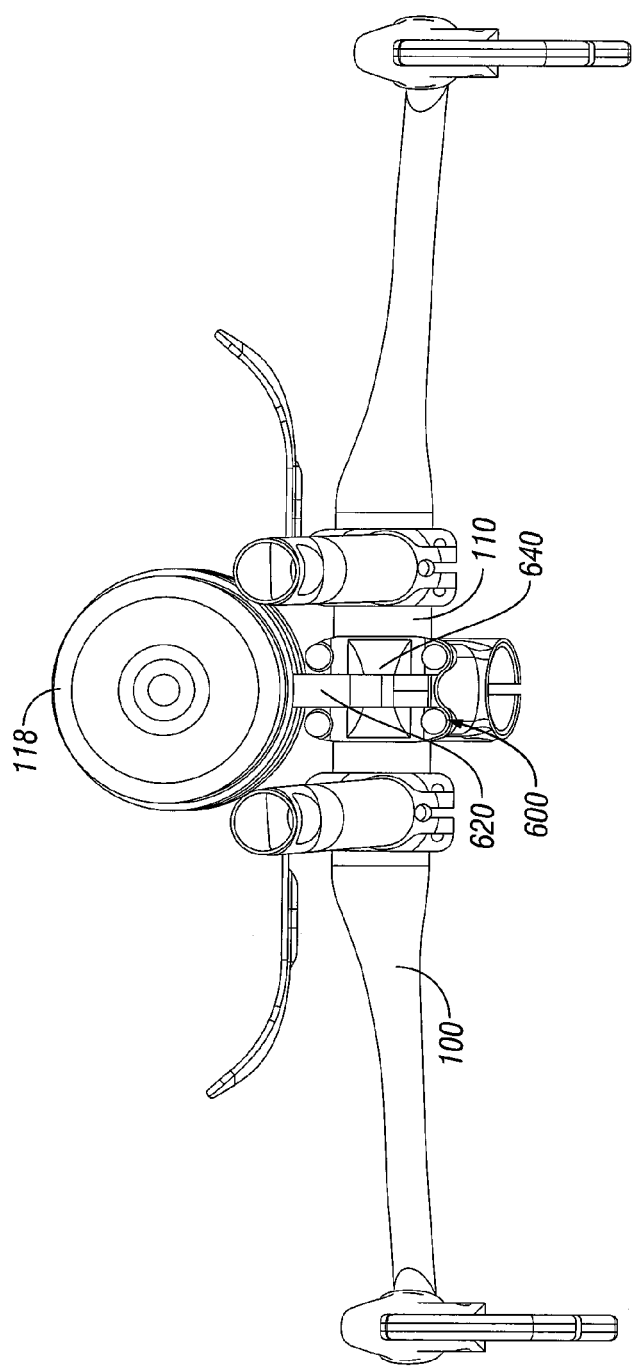
FIGS. 16-18 are diagrammatic representations of yet another embodiment of a container mount for a bicycle.
Figure 17:
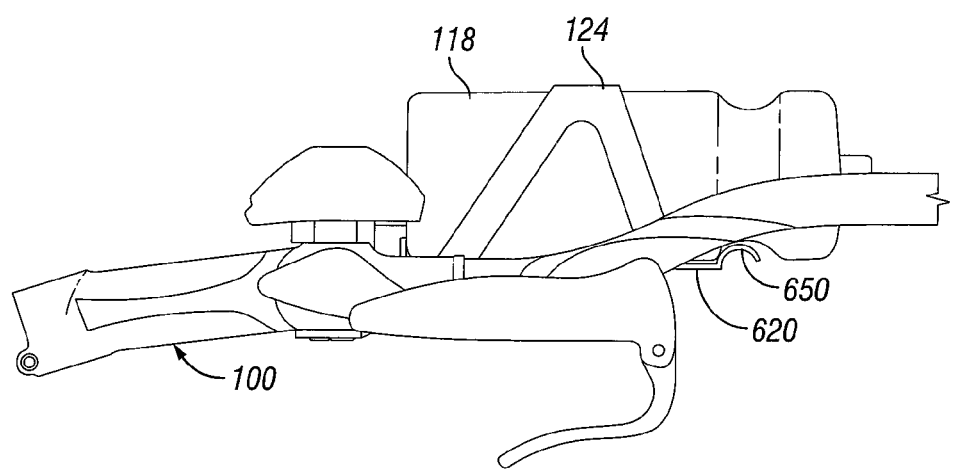
Figure 18:
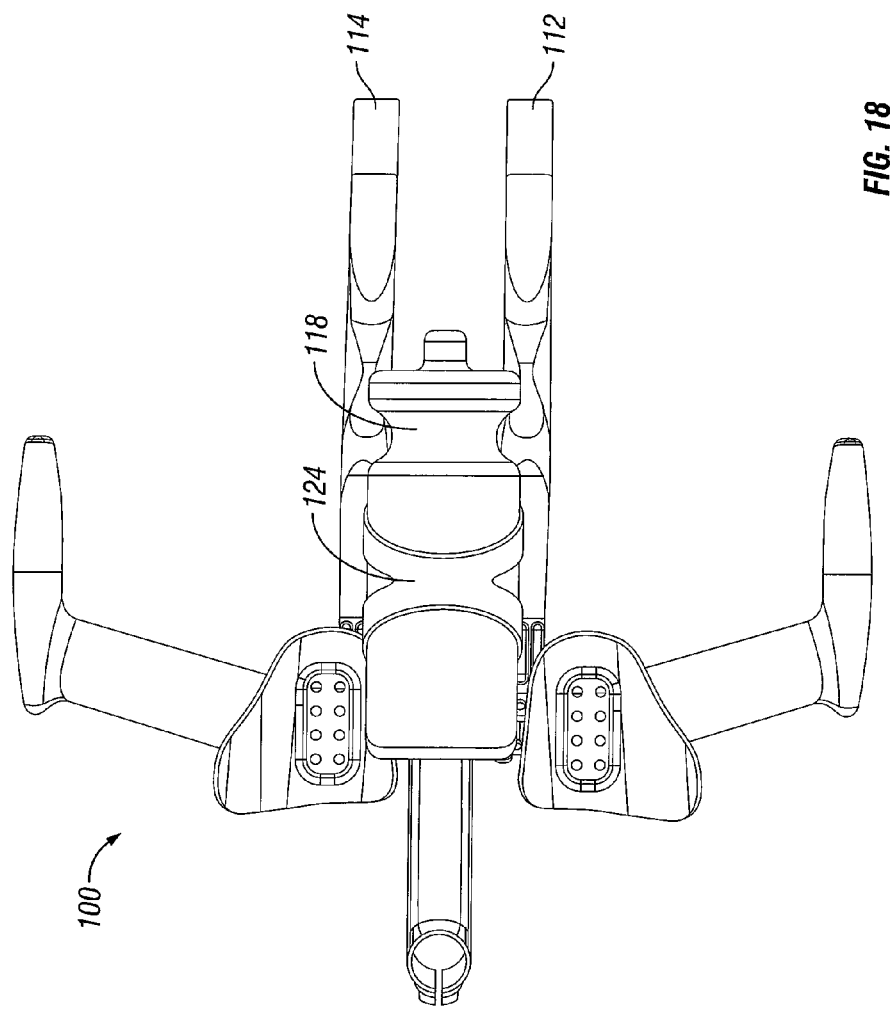

FIGS. 16-18 are diagrammatic representations showing another embodiment of a container mount 600. Container mount 600 can include a support member 620 that extends forward from a bracket 640 attached to the lateral portion 110 of aerobars 100. Bracket 640 can screw into, form a collar about or otherwise couple to aerobars 100. Bracket 640 and support member 620 can be a unitary piece or be separate pieces. If they are separate pieces, bracket 640 and support member 620 can be in fixed orientation with each other or can be adjustable relative to each other. Water bottle cage 124 can mount to support member 620 to hold water bottle 118. The height of water bottle 118 can be selected based on the mounting of bracket 640 and/or the orientation of support member 620 relative to bracket 640. Additionally, offsets can be used to raise cage 124 relative to support member 620.

FIG. 17 also illustrates that support member 620 can include a bottle retaining portion 650. In this example, bottle retaining portion 650 can be a curved portion that fits in the annular groove found near the top of many standard water bottles. Support member 620 can be manufactured to act as a spring so that retaining portion 650 remains in the groove under normal riding conditions to retain water bottle 118 in cage 124. Support member 620, however, can deflect so that water bottle 118 can be removed if the rider pulls water bottle 118 forward with sufficient force.

Figure 19:
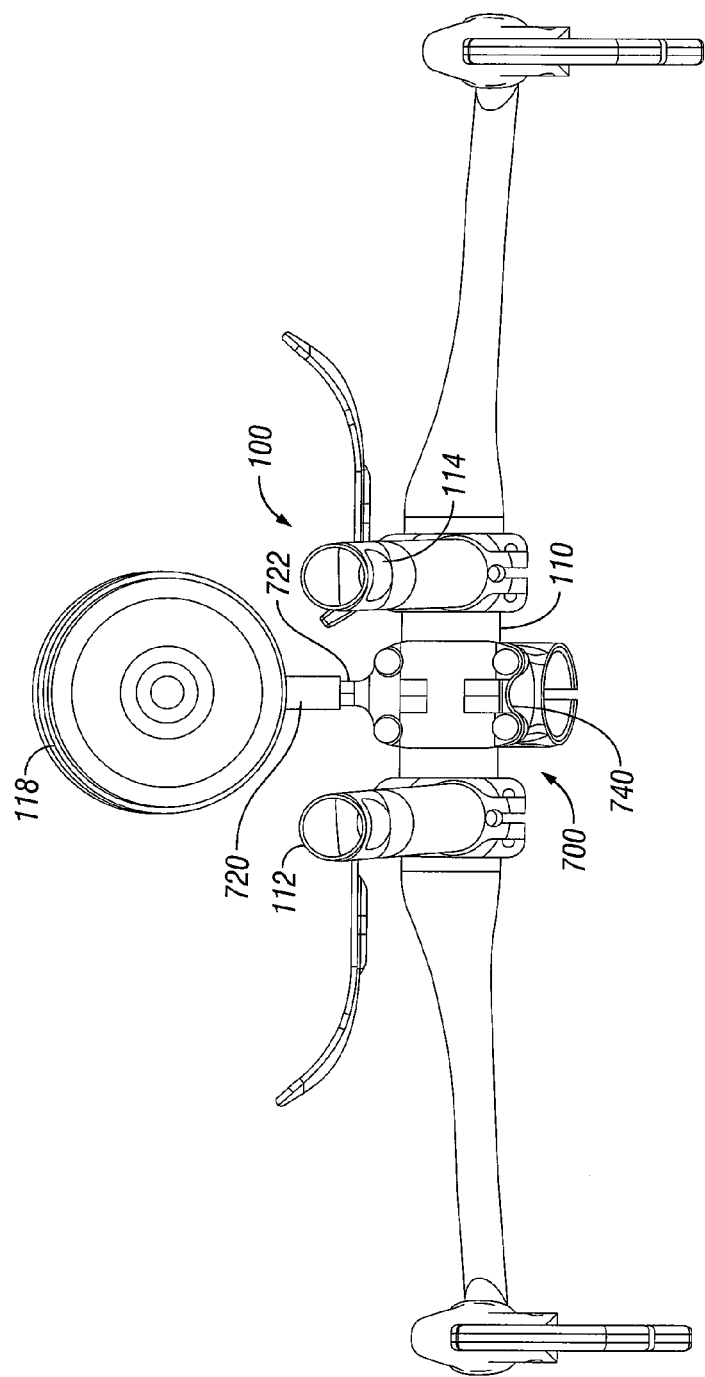
FIGS. 19-20 are diagrammatic representations of yet another embodiment of a container mount for a bicycle.
Figure 20:
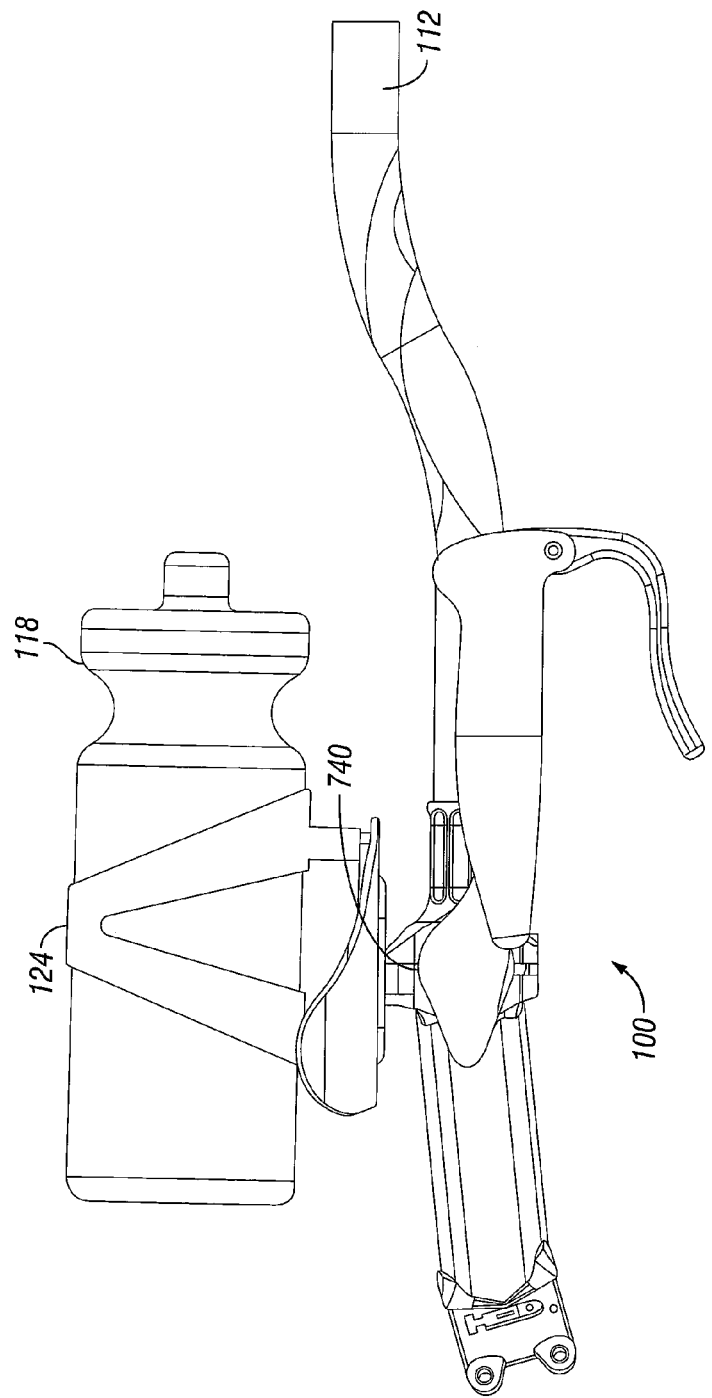

FIGS. 19 and 20 are diagrammatic representations of another embodiment of a water bottle mount 700. In this embodiment, support member 720 extends forward from the top of lateral portion 110 of aerobars 100. The water bottle mount is coupled to lateral portion 110 using a bracket 740. Bracket 740 can screw into, form a collar about or otherwise couple to aerobars 100. Bracket 740 and support member 720 can be a unitary piece or be separate pieces. If they are separate pieces, bracket 740 and support member 720 can be in fixed orientation with each other or can be adjustable. For example, support member 720 may be joined to bracket 740 at 722 with a hinge or other joint that allows bracket 720 to rotate relative to hinge 740 side-to-side and/or forward-to-back. Water bottle cage 124 can mount to support member 720 to hold water bottle 118. The height of water bottle 118 can be selected based on the mounting of bracket 740 and/or the orientation of support member 720 relative to bracket 740. Additionally, offsets can be used to raise cage 124 relative to support member 720. While FIGS. 19-20 illustrate water bottle 118 as being mounted to the top of the lateral portion 110 of aerobars 100, water bottle 118 can also be mounted to the bottom of the lateral portion 110 of aerobars 100.

Figure 21:
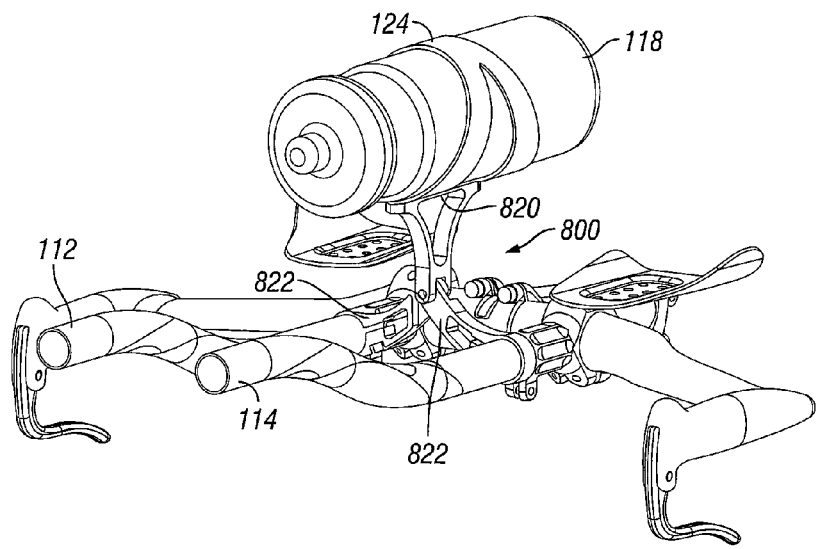
FIG. 21 is a diagrammatic representation of yet another embodiment of a container mount for a bicycle.

FIG. 21 is a diagrammatic representation showing another embodiment of a water bottle mount 800. Mount 800 is similar to mount 116 but includes collar members 822 to attach to both extensions 114 and 112. Collar members 822 can each rotate with respect to support 820 in a half-scissor like motion. In the embodiment of FIG. 21, a water bottle cage mounts to the top portion of support member 820. To raise or lower water bottle 118, collar members 822 can be rotated about the respective aerobar extensions.

Figure 22:
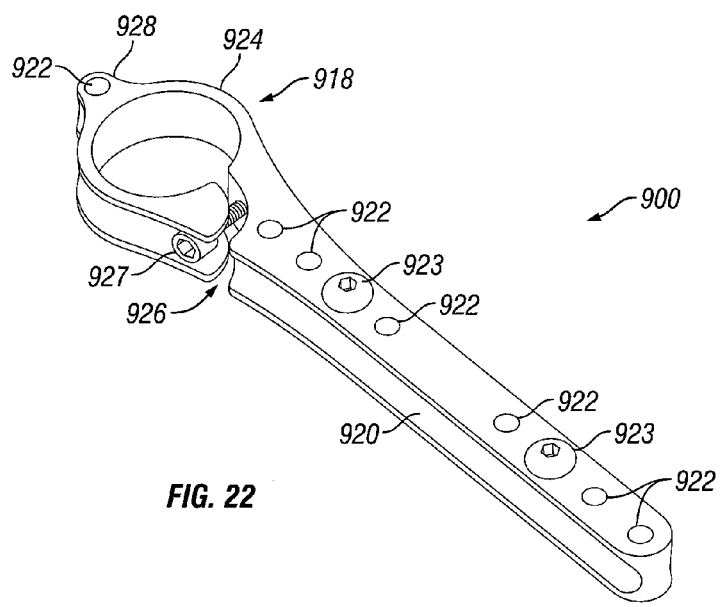
FIGS. 22-23 are diagrammatic representations of yet another embodiment of a container mount for a bicycle.

FIG. 22 is a diagrammatic representation of another embodiment of a mount 900 for mounting water bottle cage 124. A collar member 918 can be sized to fit around the steerer tube of a bicycle. A support plate 920 coupled to collar member 918 extends forward from collar member 918 generally perpendicular to the axis of the steerer tube and above the aerobars so that the water bottle is aligned between the rider's arms. The embodiment of FIG. 22 has a "lollipop" shape with a generally circular collar and relatively thin support member extending several times the diameter of the collar.

Support plate 920 can include openings 922 to receive mounting bolts (e.g., as illustrated by mounting bolts 923) for a water bottle cage 124. In one embodiment, cage 124 can be mounted to support plate 920 using offsets to raise cage 124 to a desired height.

In the embodiment of FIG. 22, support plate 920 and collar member 918 are formed of a unitary piece of material. Collar member 918 includes curved wall 924 forming an opening through which the steerer tube can pass. One end of curved wall 924 transitions into support plate 920 while the other end terminates to form a gap 926 running from the steerer tube opening to the side of mount 900. The gap provides room for adjustment. By adjusting set screw 927, the size of the opening can be changed to securely fit the steerer tube.

The mount can also include a second support member in the form of an extension 928 extending behind collar member 918. Extension 922 can include one or more openings 922 to receive mounting bolts. In this embodiment, the water bottle cage can straddle the steerer tube. In other embodiments, the water bottle cage can mount behind the steerer tube.

Figure 23:
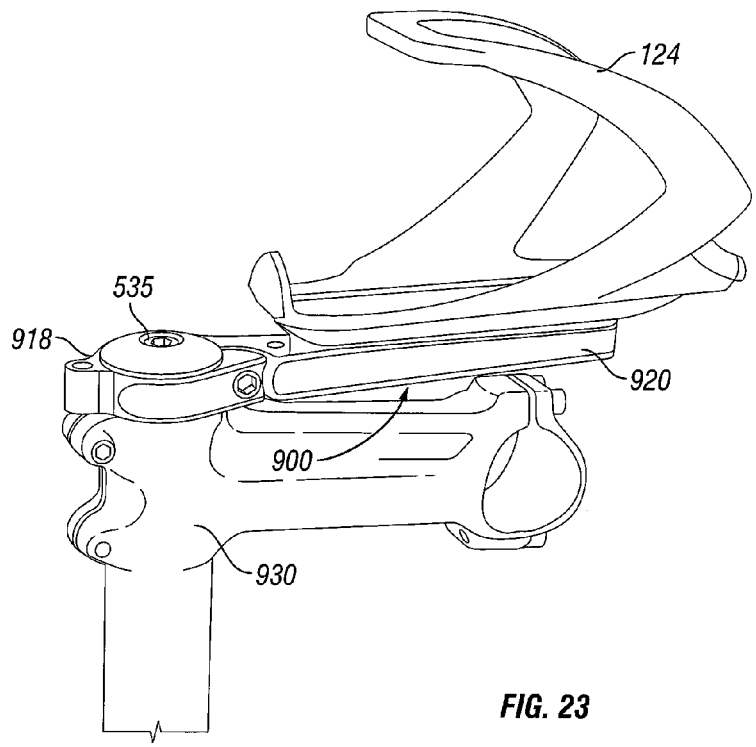

FIG. 23 illustrates an embodiment of the mount of FIG. 22 coupled to a steerer tube above a portion of the aerobars 930. Collar member 918 fits securely around the steerer tube to couple mount 900 to the bicycle. A stem cap screw 535 can be used as an additional mechanism to hold the container mount in place. A water bottle cage 124 is coupled to support member 920 in front of the steerer tube. In other embodiments, water bottle cage 124 can be positioned to straddle the steerer tube.

Figure 24:
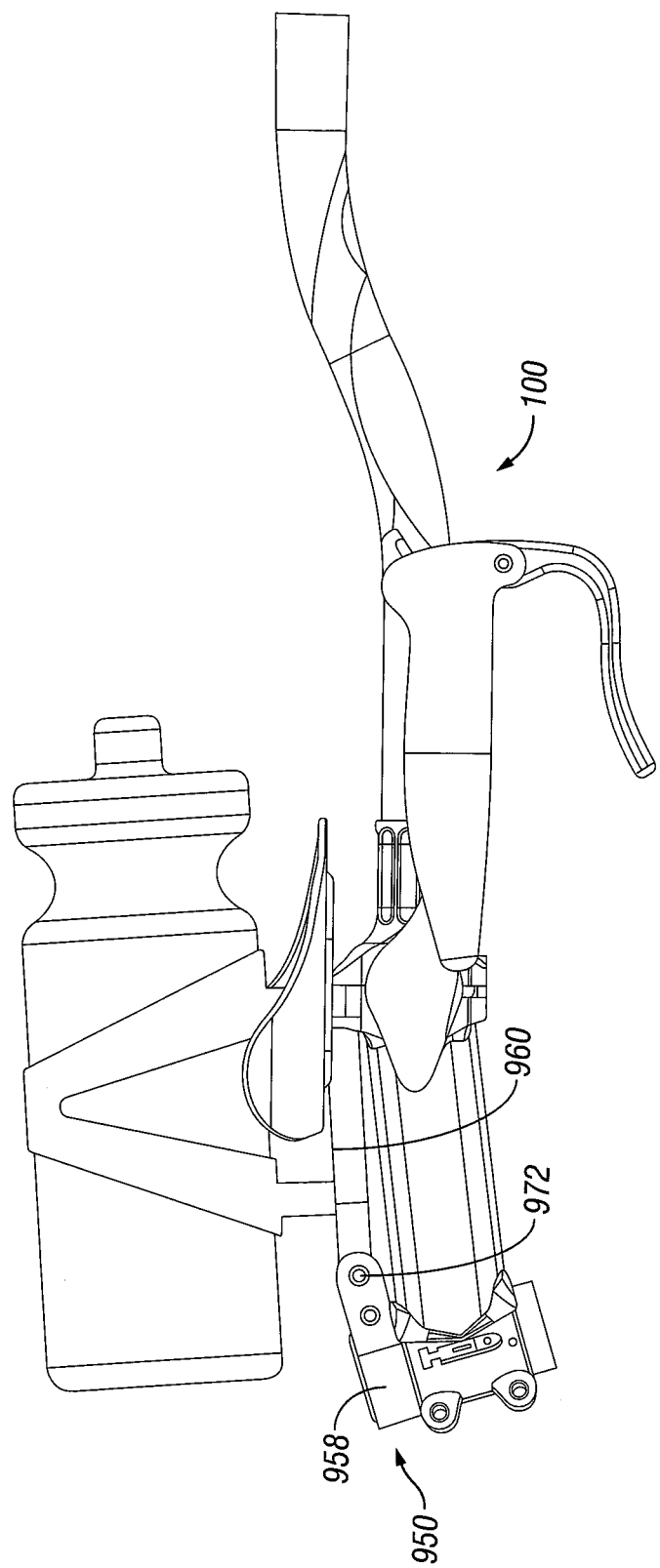
FIG. 24 is a diagrammatic representation of yet another embodiment of a container mount for a bicycle.

FIG. 24 is a diagrammatic representation of another embodiment of a mount 950 used in conjunction with aerobars 100. Mount 950 can be similar to mount 900 having an attachment member 958 that couples to the steerer tube. Support member 960 is coupled to attachment member 958 at a joint 972 that allows support member 960 to rotate. Consequently, the rider can adjust water bottle cage 124 and water bottle 118 to a desired angle.

Figure 25:
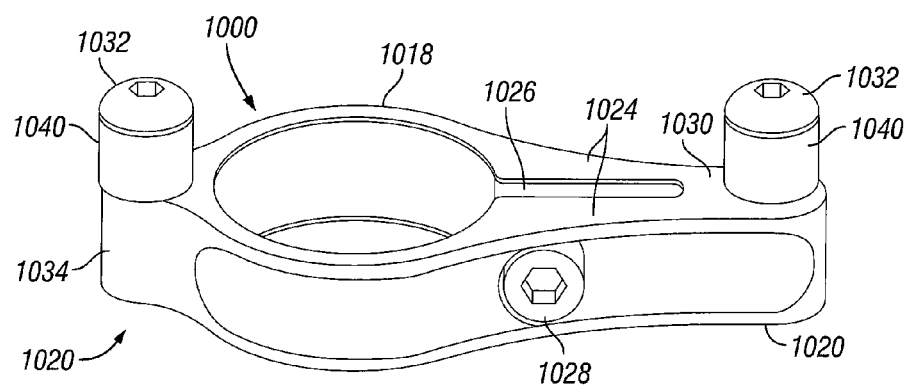

According to one embodiment, collar member 958 can include a curved sidewall that defines the opening through which the steerer tube passes. The ends of sidewall transition into arms such that there is channel between the arms open to the steerer tube opening (a similar arrangement is shown in the embodiment of FIG. 25). Adjusting a set screw causes the arms to move together tightening collar member 958 about the steerer tube.

Joint 972 can include any suitable joint to allow rotation, including a hinge or other joint. Joint 972 can be formed by a pin that passes through overlapping portions of collar member 958 and support member 960. Relative rotation can be inhibited by a ratchet mechanism, friction fit, biasing support member 960 against collar member 958 with a set screw or by another securing mechanism. Preferably relative rotation is inhibited so that the angle of support member 960 does not change as the rider removes water bottle 118 from cage 124 during normal use.

FIG. 25 is a diagrammatic representation of another embodiment of a mount 1000. Mount 1000 has a collar portion 1018 to act as an attachment member to mount to the steerer tube of the bicycle. Mount 1000 further includes portions extending from collar portion 1018 that act as support members 1020. According to one embodiment, collar portion 1018 can include a curved sidewall 1022 that defines an opening to fit the steerer tube. The ends of sidewall 1022 transition into arm portions 1024 that extend away from the steerer tube opening and are slightly separated to form a channel 1026 that is open to the steerer tube opening. This channel provides room for adjustment. Turning set screw 1028 can cause channel 1026 to contract (i.e, arms 1024 to move together), thereby tightening collar member 1018 about the steerer tube. The other end of the arms 1024 are joined to form portion 1030 having an opening to receive a water bottle cage mounting bolt 1032.

On the opposite side of the steerer tube opening, sidewall 1022 transitions into extension 1032 that extends in the other direction from arms 1024. Extension 1032 provides an opening to receive a water bottle cage mounting bolt 1032. The height of the water bottle cage can be adjusted using spacers 1040. FIG. 26 illustrates an embodiment of mount 1000 coupled to a steerer tube above aerobars 100. Water bottle cage 124 is positioned to straddle the steerer tube to bring water bottle 118 closer to the rider.

The various container mounts described above can be configured so that the container rests in a position between the rider's arms. For example, a water bottle can be positioned between the rider's forearms (e.g., as shown in FIGS. 5 and 6), between the rider's elbows, or behind the rider's elbows but between the rider's arms when viewed from the front. The container is positioned to be fully within the profile of the rider's torso. In one embodiment, a water bottle can be mounted so that the widest portion of the water bottle is higher than the height of the rider's forearms. In another embodiment, the widest portion of the water bottle can be higher than the rider's forearms for a front portion of the water bottle (e.g., the front ⅛th, ¼th, ½, or other desired portion of the water bottle closest to the front (relative direction of travel)). Because the rider's arms can fit under the widest portion of the water bottle, the rider can place extensions 112 and 114 closer together with his or her arms potentially contacting the water bottle, water bottle cage, other container or container holder, while maintaining the container in an easy to reach position. The container mount can be formed of a material so that the container mount does not yield (irreversibly deform) if the rider's arms push against the container or container holder during strenuous riding or when the rider accesses the container. In other embodiments, the container can be placed far enough back that the rider can bring the extensions together without his or her forearms contacting the water bottle.

While the above described embodiments are discussed in terms of mounting a water bottle, embodiments can be used to aerodynamically mount other containers for liquids, solid foods or other items. Furthermore, while the various figures show a standard water bottle, nonstandard or aerodynamically shaped water bottles or other containers can be used. The water bottle or other liquid container can further include a straw so that the rider does not have to remove the water bottle/container to hydrate. Additionally, the water bottle cage can be a standard cage or nonstandard cage.

The embodiments described above are provided by way of example and water bottles (or other containers) can be supported in any number of manners. According to one embodiment, for example, a water bottle cage can mount to a plate that is attached to aerobar extensions 112 and 114 with cable ties, hook and eye straps or other mechanism. In another embodiment, the plate can include spaced holes to allow the plate to be attached to the aerobar extensions using screws. In such an embodiment, the plate can have holes in a number of locations to accommodate a number of spacings between aerobar extensions. In another embodiment, multiple plates can span between aerobar extensions 112 and 114 and be attached to the aerobar extensions using collars, straps, screws or other mechanisms. Another embodiment may include a relatively thin mount the mounts to the top of the steerer tube using the step cap screw. The mount can include tabs that extend forward and backward from the steerer tube with mounting holes for the water bottle cage. Such an embodiment can be made from thin aluminum, sheet metal or other thin material. In some cases, the support member(s) may be integrated with a water bottle cage such that the water bottle cage attaches to the aerobar extensions, steerer tube or other portion of the bicycle.

Furthermore, the examples of aerobars in the figures are provided by way of example. Embodiments described herein can be used with any number of different aerobar arrangements including aerobars that have straight extensions, s-bend extensions or ski bend extension (where the extension extends straight out, but bends up at the end) or other extensions. Furthermore, various embodiments described herein can be used with bicycles including mountain bikes or other bikes that lack aero bars.

While this disclosure describes particular embodiments, it should be understood that the embodiments are illustrative and that the scope of the invention is not limited to these embodiments or dimensions provided. Many variations, modifications, additions and improvements to the embodiments described above are possible. It is contemplated that these variations, modifications, additions and improvements fall within the scope of this disclosure.

What is claimed is:

1. A container mount for a bicycle having aerobars with extensions, said container mount comprising:
   an attachment member adapted to clamp to an outer surface of a steerer tube of a bicycle, the attachment member comprising a first surface on a first side, a second surface on an opposite side, and a curved sidewall defining a steerer tube opening from the first surface to the second surface, said steerer tube opening adapted to receive and engage with the steerer tube, the curved sidewall having a first end and a second end;
   one or more support members coupled to the attachment member, the one or more support members comprising a center front support member extending forward from the attachment member generally perpendicular to a center axis of the steerer tube opening and a plurality of mounting openings on the first side, the plurality of mounting openings adapted to receive hardware of a water bottle cage and at least one of the plurality of mounting openings disposed along the center front support member; and
   wherein the first end of the curved sidewall transitions into the front center support member and the second end terminates adjacent to the first end to define the steerer tube opening, and the container mount is adapted to couple to the steerer tube above a portion of an aerobar coupled to the steerer tube such that the front center support member is in a position that is aligned with a center axis of the steerer tube;
   wherein the one or more support members comprise a center back support member extending back from the attachment member in a direction generally opposite from the center front support member;
   the plurality of mounting openings comprise at least one opening on the center front support member and at least one opening on the center back support member to receive the mounting hardware for the water bottle cage;

wherein said plurality of mounting openings have their longitudinal axes aligned substantially parallel to and substantially coplanar with the longitudinal axis of the steerer tube opening;

wherein said container mount is suitably configured to fit within an aerodynamic profile of a bicycle rider's torso in a position forward of the rider's torso and between the rider's arms; and wherein said container mount is further configured to permit the rider access to a container mounted thereon while the rider operates the bicycle maintaining aerodynamic form.

2. The container mount of claim 1, wherein:
the center front support member comprises a support plate extending forward from the attachment member and the plurality of mounting openings comprise a first set of openings on a distal end of the support plate and a second set of openings between the first set of openings and the steerer tube opening.

3. The container mount of claim 1, wherein:
the attachment member and
the one or more support members are formed of a unitary piece of material.

4. The container mount of claim 1, wherein a distance between the first end and second end of the curved sidewall is adjustable.

5. The container mount of claim 1, wherein the second end of the curved sidewall is separated from the first end of the curved sidewall by a gap open to the steerer tube opening.

6. The container mount of claim 5, further comprising a screw passing through the curved sidewall proximate to the second end and adapted to adjust the size of the gap.

7. The container mount of claim 1, wherein the at least one opening on the center front support member and at least one opening on the center back support member are suitably configured to permit the water bottle cage to be mounted in a position straddling, or behind, the steerer tube.

8. The container mount of claim 1, wherein the container mount is configured such that a container mounted thereon can be removed by sliding the container forward in a direction perpendicular to the center axis of the steerer tube.

9. The container mount of claim 3, wherein the container mount has a generally lollipop shape.

10. The container mount of claim 1, wherein one or more support members are coupled to the attachment member at a joint that allows the one or more support members to rotate.

11. A method of holding a container on a bicycle with aerobars having extensions:
providing a container mount suitably configured to fit within an aerodynamic profile of a bicycle rider's torso in a position forward of the rider's torso and between the rider's arms and permit the rider access to a container mounted thereon while the rider operates the bicycle maintaining aerodynamic form;
wherein the container mount comprises:
an attachment member adapted to clamp to an outer surface of a steerer tube of the bicycle, the attachment member comprising a first surface on a first side, a second surface on an opposite side, and a curved sidewall defining a steerer tube opening from the first surface to the second surface, said steerer tube opening adapted to receive and engage with the steerer tube, the curved sidewall having a first end and a second end, the first end of the curved sidewall transitions into the front center support member and the second end terminates adjacent to the first end to define the steerer tube opening;
one or more support members coupled to the attachment member, the one or more support members comprising a center front support member extending forward from the attachment member generally perpendicular to a center axis of the steerer tube opening and a plurality of mounting openings on the first side, the plurality of mounting openings adapted to receive hardware of a water bottle cage and at least one of the plurality of mounting openings disposed along the center front support member, wherein the one or more support members comprise a center back support member extending back from the attachment member in a direction generally opposite from the center front support member, the plurality of mounting openings comprise at least one opening on the center front support member and at least one opening on the center back support member to receive the mounting hardware for the water bottle cage, and wherein the plurality of mounting openings have their longitudinal axes aligned substantially parallel to and substantially coplanar with the longitudinal axis of the steerer tube opening; and
coupling the attachment member to the steerer tube of the bicycle above a portion of aerobars that couples to the steerer tube such that the front center support member is in a position that is aligned with a center axis of the steerer tube.

12. The method of claim 11, wherein:
the center front support member comprises a support plate extending forward from the attachment member and the plurality of mounting openings comprise a first set of openings on a distal end of the support plate and a second set of openings between the first set of openings and the steerer tube opening.

13. The method of claim 11, wherein the attachment member and the one or more support members are formed of a unitary piece of material.

14. The method of claim 11, wherein a distance between the first end and second end of the curved sidewall is adjustable.

15. The method of claim 11, wherein the second end of the curved sidewall is separated from the first end of the curved sidewall by a gap open to the steerer tube opening.

16. The method of claim 15, wherein a screw passes through the curved sidewall proximate to the second end and adapted to adjust the size of the gap.

17. The method of claim 11, wherein the at least one opening on the center front support member and at least one opening on the center back support member are suitably configured to permit the water bottle cage to be mounted in a position straddling, or behind, the steerer tube.

18. The method of claim 11, wherein the container mount is configured such that a container mounted thereon can be removed by sliding the container forward in a direction perpendicular to the center axis of the steerer tube.

19. The method of claim 13, wherein the container mount has a generally lollipop shape.

20. The method of claim 11, wherein one or more support members are coupled to the attachment member at a joint that allows the one or more support members to rotate.

\* \* \* \* \*